Aug. 28, 1928.
W. A. ALDER
1,682,163
OPTICAL SIGN PROJECTOR
Filed Dec. 23, 1926     2 Sheets-Sheet 2
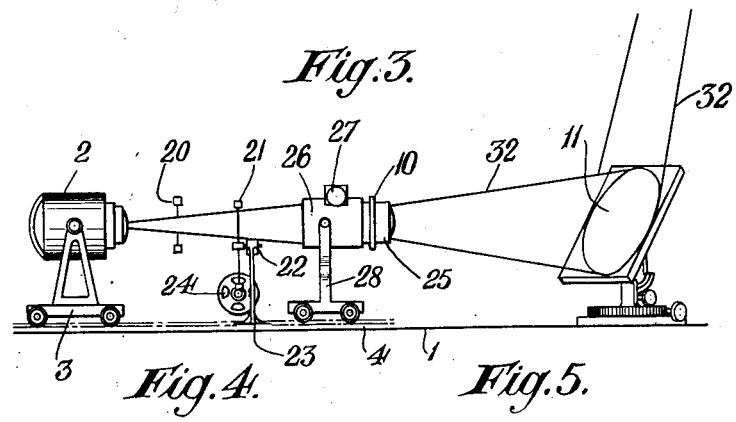
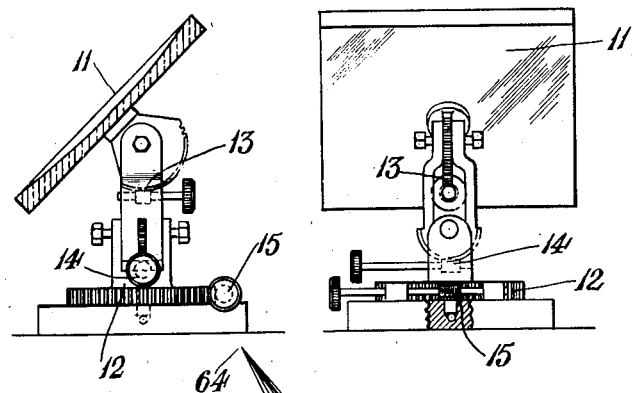
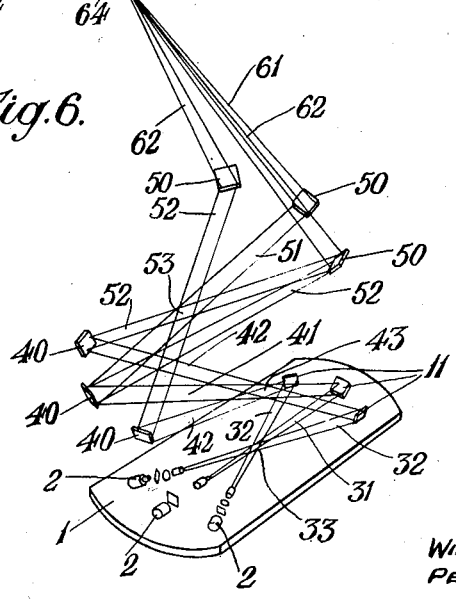
INVENTOR:—
WILLIAM ARTHUR ALDER
PER:—
ATTORNEYS Patented Aug. 28, 1928.

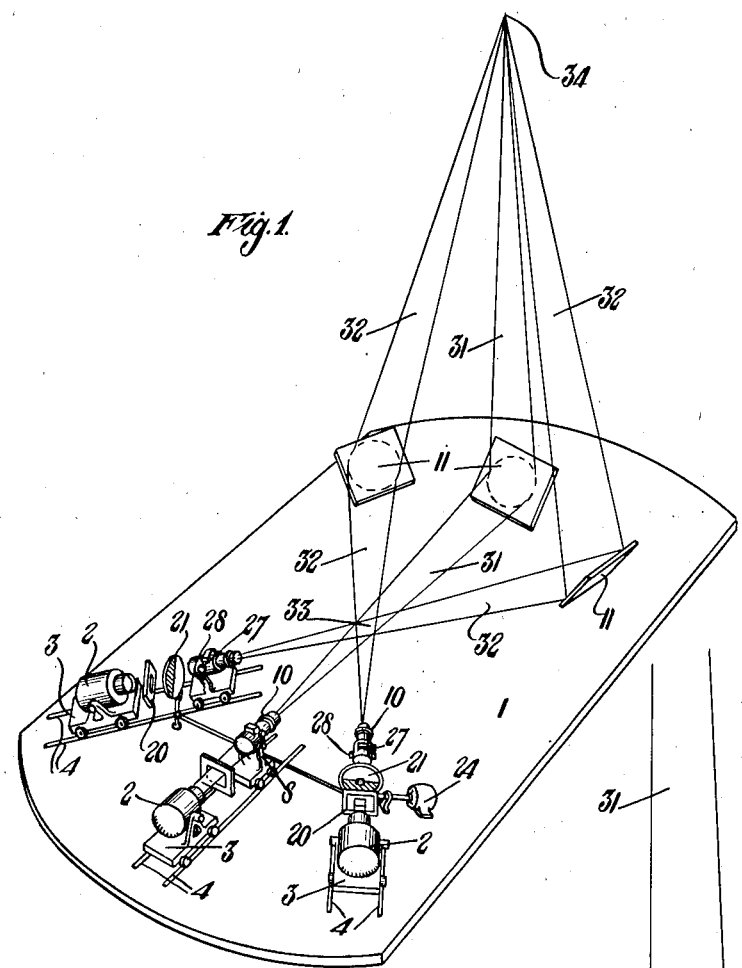

1,682,163

UNITED STATES PATENT OFFICE.

WILLIAM ARTHUR ALDER, OF KENNINGTON, LONDON, ENGLAND, ASSIGNOR, BY MESNE ASSIGNMENTS, TO INTERNATIONAL SKYWRITERS LIMITED, OF TORONTO, CANADA, A COMPANY OF ONTARIO.

OPTICAL SIGN PROJECTOR.

Application filed December 23, 1926. Serial No. 156,646.

This invention relates to optical sign projectors intended for projecting signs into space, and adapted for use for advertising and other purposes. The object is to enable signs in the form of pictures, words, or the equivalent to be projected into space so as to be clearly visible to any observer without the necessity for employing a visible or tangible background upon which the pictures or signs are projected. A method of putting my invention into practice will now be described in conjunction with drawings showing a suitable apparatus for the purpose, and in which:—

Fig. 1 is a perspective view of a simple form of apparatus illustrating diagrammatically how a sign is projected into space so as to become visible to any observer.

Fig. 2 is a longitudinal section through the center line of the apparatus showing the arrangement of one light projector and its attendant accessories.

Fig. 3 is a similar view taken along the axis of one of the outer projectors.

Figs. 4 and 5 are respectively part sectional elevation and rear elevation of suitable reflecting mirrors mounted upon universally adjustable supports, and Fig. 6 is a diagrammatic perspective view showing how the various light beams may be reflected by a multiplicity of reflectors so as to cross each other repeatedly at a number of points before the final deflection to a point at which the picture will become visible.

Fig. 1 shows a base board 1 upon which are mounted a number of optical projecting lanterns 2. These should not be less than two in number but three are shown in the drawings. Each projecting lantern 2 is adjustably mounted on a platform 3 movable longitudinally upon guides 4. These guides 4 are arranged at suitable angles to each other preferably radiating from a point so that the beams of light from all the projectors will intersect at one given point. The guides 4 may be mounted on the table 1 so that their angularity to each other may be adjustable. One of the projectors 2 is arranged to project an image of the picture or sign intended to be displayed and in Fig. 1 this is the centre projector. A longitudinal section through the centre projector is shown in Fig. 2 in which it will be seen that in front of the projector 2 is mounted a slide 5 in the form of a transparency, stencil or its equivalent of the picture to be displayed. A suitable objective lens 7 is adjustably mounted on a carriage 8 supported on the guides 4 and arranged in front of the slide 5. This objective lens 7 is shown in a mount provided with adjusting means 7ª for focussing purposes. Within the lens mount is also arranged a diaphragm 9 which may be adjustable or interchangeable and is preferably of the iris type adapted to be actuated by a rotatable ring 10 on the outside of the lens mount.

Immediately opposite the centre projector 2 and at the other side of the base 1 is provided a mirror or reflector 11. This mirror 11 is supported on a mount 12 so that it may be adjustable in all directions. For this purpose a worm and segment adjustment 13 is provided for varying the angle of the reflector in a fore and aft direction, whilst a second adjustment 14 is provided for varying the angle of the reflector in a lateral direction. The mount 12 is adapted to swivel about its vertical axis and a worm and tooth wheel adjustment 15 may be provided for rotating the mount and the reflector about this axis.

At least one additional light projector 2 is provided and in Fig. 1 two such additional projectors are shown one upon each side of the centre projector. A side elevation through the axes of these additional projectors and their accessories is shown in Fig. 3. In front of the projector is mounted a suitable apertured mask 20 the aperture in which preferably corresponds to the shape or area of the picture being projected by the centre projector 2. In front of the mask 20 is arranged a rotating colour filter 21, here shown mounted to rotate about a spindle 22 supported in a bracket 23 on the base 1. Suitable means are provided to rotate the colour filter 21 such for instance as the electric motor 24. Where more than one additional projector 2 is employed as shown in Fig. 1, the means for driving the colour filters 21 are interconnected so that the filters will be synchronized and move in unison. Each colour filter 21 is divided into two or more segments of different colours so that as they rotate the colour of the beam projected from the projector will be constantly changing. These colour filters are preferably so arranged and synchronized that the colours of the beams from each of the additional projectors will alternate. Taking the case illustrated in Fig. 1 and supposing the colours to be red and green, then the two colour filters 21 will be divided into red and green spaces of appropriate dimensions. The gearing through which the colour filters are rotated will be so arranged that when the filter of the right-hand projector is in a position to colour its beam red the filter of the left-hand projector will be in a position to colour its beam green and conversely.

In front of each of the colour filters 21 is arranged an objective lens 25 in a mount 26 provided with a focussing adjustment 27. The lens mount is supported in the adjustable carriage 28 mounted upon the guides 4. Opposite to each of the additional projectors 2 and at the other side of the base 1 is mounted a mirror 11 similar to the mirror 11 arranged opposite to the centre projector 2. This mirror is provided with similar methods of adjustment to that already described and the method of mounting and adjusting is shown in detail in Figs. 4 and 5. Each of the mirrors 11 are thus adapted to swivel about a vertical axis and to be inclined at any angle to the axis of the beams of light projected upon them.

The beam of light 31 from the centre projector 2 is directed upon its mirror 11 by which it is deflected upwardly into the atmosphere. The beams of light 32 from each of the additional projectors 2 intersect and cross the path of the beam of light 31 from the centre projector at the common point of intersection 33. The beams of light 32 then fall upon their reflectors 11 which deflect them in an upward direction, the reflectors being adjusted so as to cause the beams of light 32 and the beam of light 31 to meet together at a common position 34 in the air at which position an image of the slide 5 will become visible to observers.

If desired the beams of light 31 and 32 may be made to cross a number of times by interposing additional reflectors before directing the beams upwardly to the point 34 at which the image is to be viewed. Fig. 6 illustrates diagrammatically the arrangement of such additional reflectors. The base board 1 with the projectors 2 and their accessories and the reflectors 11 are arranged in the same manner as shown in Fig. 1 with the beams of light 31 and 32 crossing at the point 33. The reflectors 11 are however, arranged at such an angle as to reflect the beams of light 31 and 32 back onto other reflectors 40. The reflected beams of light 41 and 42 then intersect at 43. The reflectors 40 may again reflect the beams onto still further reflectors 50 so that the reflected beams 51 and 52 cross at the intersecting point 53. This may be repeated as often as desired by means of a suitable positioning of additional sets of reflectors in the manner shown in Fig. 6. The beams of light 61 and 62 are reflected from the last set of reflectors 50 so as to meet at the point 64 at which the image will be visible to an observer.

The position of the revolving colour filters 21 may be varied as desired. They may be placed behind the apertured masks 20 or in front of the objective lens 25 or in any other convenient position at which they will effectively colour the projected beam of light. The iris or other diaphragms may be arranged either within the lens mount or in front of or behind the same and these may be suitably arranged to regulate the intensity of the light so as to adjust or vary the intensity of the different beams relatively to each other so as to obtain the best results. If desired colour filters may be arranged to operate in conjunction with stationary or oscillating condensers, mirrors or lenses to distribute light in various directions. Dissolving iris diaphragms may be arranged in conjunction with the colour filters to blend the beams of light so as to produce the desired combination of colours to render the image most effectively visible.

I claim:—

1. Sign projecting apparatus comprising an optical projector, a transparent sign and an objective lens located so that a beam of light will be projected through them and a reflector to direct the picture beam up toward the sky, a number of additional projectors, rotatable colour filters and objective lenses mounted in front of the projectors, means for driving the colour filters synchronously so that the varying colours of each beam will alternate with the colours of the other beams, each projector being arranged to project its beams of light at an angle to and across the picture beam, and a number of reflectors to deflect the additional beams upwardly so as to meet and register with the picture beam at a common position at which the picture will become visible.

2. Sign projecting apparatus comprising an optical projector, a transparent sign and an objective lens located so that a beam of light will be projected through them and a reflector to direct the picture beam up toward the sky, a number of additional projectors, rotatable colour filters and objective lenses mounted in front of the projectors, means for driving the colour filters synchronously so that the varying colours of each beam will alternate with the colours of the other beams, each projector being arranged to project its beams of light at an angle to and across the picture beam, a number of reflectors to deflect the additional beams upwardly so as to meet and register with the picture beam at a common position at which the picture will become visible, and means for mounting these reflectors so as to be adjustable in any direction so as to facilitate registration of the beams.

3. Sign projecting apparatus comprising a base, a number of optical projectors mounted on guides on the base arranged at an angle to one another so that the beams of light from each will cross one another, objective lenses in front of each projector, a reflector opposite each projector to deflect the beams from each to meet at a common position, a transparency of the sign arranged in front of one of the projectors, rotatable colour filters and apertured masks arranged in front of the other projectors and means for rotating these colour filters in synchronism.

4. Sign projecting apparatus comprising a base, a number of optical projectors mounted on guides on the base arranged at an angle to one another so that the beams of light from each will cross one another, an objective lens in front of each projector, a focussing mount and adjustable diaphragm to each objective, a reflector opposite each projector to deflect the beams from each to meet at a common position, a transparency of the sign arranged in front of one of the projectors, rotatable colour filters and apertured masks arranged in front of the other projectors and means for rotating these colour filters in synchronism.

5. Sign projecting apparatus comprising a base, a number of optical projectors mounted on guides on the base arranged at an angle to one another so that the beams of light from each will cross one another, an objective lens in front of each projector, a reflector opposite each projector to deflect the beams from each to meet at a common position, a universally adjustable mount for supporting each reflector, a transparency of the sign arranged in front of one of the projectors, rotatable colour filters and apertured masks arranged in front of the other projectors and means for rotating these colour filters in synchronism.

6. Sign projecting apparatus comprising a base, a number of optical projectors mounted on guides on the base arranged at an angle to one another so that the beams of light from each will cross one another, an objective lens in front of each projector, a focussing mount and adjustable diaphragm to each objective, a reflector opposite each projector to deflect the beams from each to meet at a common position, a universally adjustable mount for supporting each reflector, a transparency of the sign arranged in front of one of the projectors, rotatable colour filters and apertured masks arranged in front of the other projectors and means for rotating these colour filters in synchronism.

7. Sign projecting apparatus comprising a base, a number of optical projectors mounted on guides on the base, arranged at an angle to one another so that the beams of light from each will cross one another, an objective lens in front of each projector, a reflector opposite each projector to deflect the beams from each to meet at a common position, a universally adjustable mount for supporting each reflector comprising a base adapted to swivel about a vertical axis, a part adapted to hinge in a lateral direction and supporting the reflector by a pivot so that it may hinge in a fore and aft direction, a transparency of the sign arranged in front of one of the projectors, rotatable colour filters and apertured masks arranged in front of the other projectors and means for rotating these colour filters in synchronism.

8. Sign projecting apparatus comprising a base, a number of optical projectors mounted on guides on the base arranged at an angle to one another so that the beams of light from each will cross one another, an objective lens in front of each projector, a focussing mount and adjustable diaphragm to each objective, a reflector opposite each projector to deflect the beams from each to meet at a common position, a universally adjustable mount for supporting each reflector comprising a base adapted to swivel about a vertical axis, a part adapted to hinge in a lateral direction and supporting the reflector by a pivot so that it may hinge in a fore and aft direction, a transparency of the sign arranged in front of one of the projectors, rotatable colour filters and apertured masks arranged in front of the other projectors and means for rotating these colour filters in synchronism.

9. A sign projector comprising a base, three projectors mounted thereon, guides on the base upon which the projectors may be adjusted, these guides being arranged so that the beams from the projectors will cross at a common point of intersection, adjustable carriages mounted on the guides and supporting objective lenses in front of each projector, focussing mounted for these objective lenses, a transparency of the sign to be projected, placed between the centre projector its objective lens, apertured masks and multi-coloured colour filters between the other projectors and their objective lenses, gearing connecting the two colour filters so that they will be rotated in synchronism, and reflectors arranged opposite to each projector to deflect the beams therefrom upwardly to a common point.

10. A sign projector comprising a base, three projectors mounted thereon, guides on the base upon which the projectors may be adjusted, these guides being arranged so that the beams from the projectors will cross at a common point of intersection, adjustable carriages mounted on the guides and supporting objective lenses in front of each projector, focussing mounts for these objective lenses, a transparency of the sign to be projected, placed between the centre projector its objective lens, apertured masks and multi-coloured colour filters between the other projectors and their objective lenses, gearing connecting the two colour filters so that they will be rotated in synchronism, reflectors arranged opposite to each projector to deflect the beams therefrom upwardly to a common point, a universally adjustable mount to each reflector comprising a base rotatable about a vertical axis by a worm and gear teeth, an intermediate arm hinged to the base and provided with a worm and segment adjustment, and a hinge connection between the reflector and the intermediate arm at right angles to the connection between it and the base and a worm and segment adjustment thereto, the whole permitting accurate registration of the beams of light.

WILLIAM ARTHUR ALDER.